Figure 1:
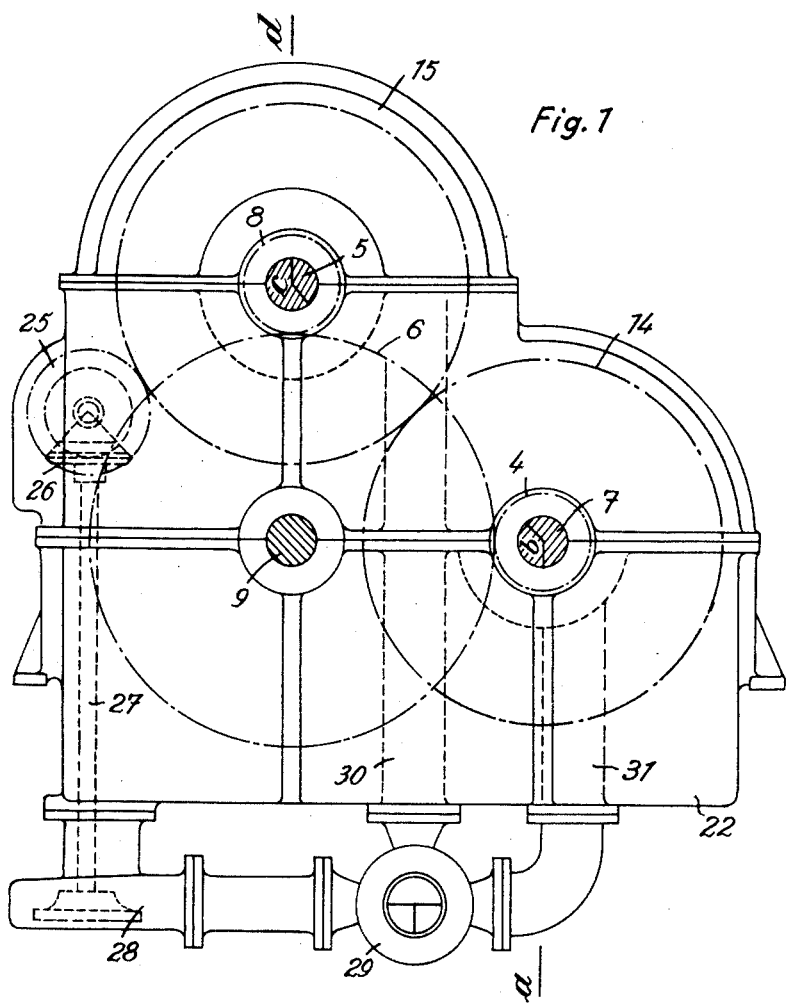

Aug. 28, 1928.

G. BAUER 1,682,593

REVERSING DEVICE FOR WORKING SHAFTS

Filed March 4, 1927     2 Sheets-Sheet 1

Inventor
Gustav Bauer.
by
Attorney

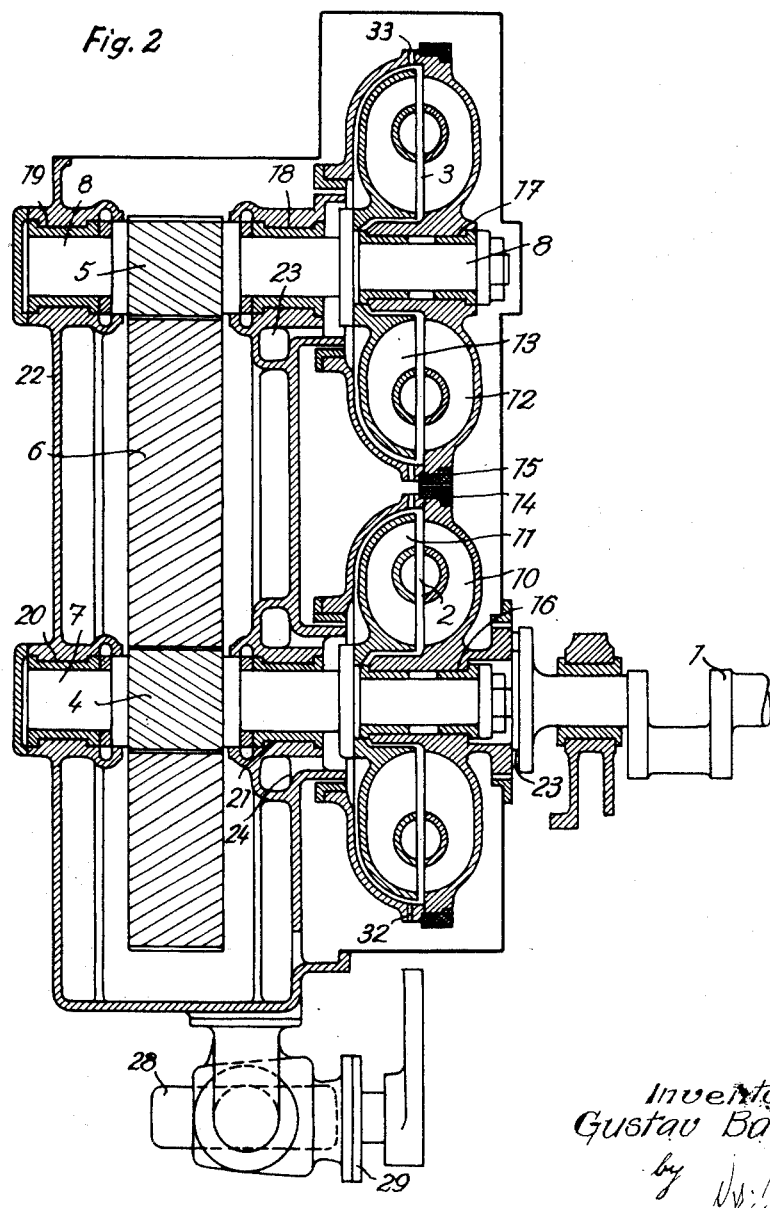

Patented Aug. 28, 1928.

1,682,593

UNITED STATES PATENT OFFICE.

GUSTAV BAUER, OF HAMBURG, GERMANY.

REVERSING DEVICE FOR WORKING SHAFTS.

Application filed March 4, 1927, Serial No. 172,806, and in Germany March 23, 1926.

My invention relates to a device for reversing working shafts, for instance propeller shafts of vessels, rolling mill sets, conveying plants and the like, driven by one or several high-speed non-reversing engines by the intermediary of liquid transmission gears and cog-wheel gearings.

With the known constructional forms of that type there are generally two liquid gearings, one for the one direction of rotation, the other for the other direction of rotation, and together with the appertaining cog-wheel gearings arranged on an extension of the engine shaft. One of said liquid gearings is generally designed as a liquid coupling because of better efficiency, whereas the other is provided with a reversing ring for reversing the direction of rotation. But also the second liquid gearing has been designed already as a liquid coupling, and an intermediate wheel has been provided for reversing the direction of rotation. Any of these constructional forms necessitates, however, for each liquid gearing and each liquid coupling a separate inlet slide-valve and outlet-valve, as well as control members or gears for the actuation of the same, and these members or gears must be interlocked with each other in order to warrant an unobjectionable and safe service. The tendency is to be able to do with as few control members or gears as possible, partly to simplify the plant, especially the control, and partly to save erection costs.

Now, the present invention relates to a simple arrangement and combination of parts for reversing working shafts driven by high-speed non-reversing engines by the intermediary of liquid transmission gears and cog-wheel transmission gears, that arrangement and combination being such that the liquid gears require no control members for the inlet and none for the outlet.

The chief characteristic feature of the invention resides therein that there are provided two liquid transmission gears or couplings, each being arranged separately on a shaft, and that the driving members of these gears or couplings are provided with teeth which mesh with each other. The pinion of one of the gears or couplings is secured in known manner to an extension of the engine shaft, and the pinion of the other gear or coupling is affixed to a counter shaft located parallel to said engine shaft.

When the working shaft is rotating in the one direction for instance when the propeller of a vessel is driving ahead, the propeller is rotated in known manner by the engine shaft by the intermediary of a liquid gearing (now filled) arranged on this shaft, and of the appertaining pinion and the large cog-wheel. When the shaft is rotated in the other direction, for instance when a propeller is pulling a ship astern, the propeller shaft is driven by the intermediary of the (now empty) liquid gearing located upon the engine shaft, by the cogged rims of the driving members of the gearings, the appertaining pinions, and by the large wheel.

The two liquid gears or couplings are, for the sake of simplicity, so designed as to have no control members for the inlet and none for the outlet of the liquid. Filling the circuits of the liquid gearings, as well as emptying them, is effected solely by connecting the filling pump with, or disconnecting it from the one or the other liquid gearing or coupling. The arrangement is such that the filling pump fills the one circuit directly, whereas it sucks the liquid from the other circuit whereby the emptying of the respective gearing is greatly facilitated. As there are no outlet slide-valves provided, the filling pump must run continually and replace the service liquid flowing away through the outlet apertures and getting lost by leakages. This manner of operation presents the advantage that a good abstraction of heat from the interior of the gearings takes place and that the service liquid is not too strongly heated. On the other hand, the arrangement and manner of operation stated necessitates, it is true, a somewhat larger pump output but this is by no means material and can be taken into the bargain at once, chiefly in view of the simplicity of the whole, especially if water can be used as service liquid.

The invention is illustrated diagrammatically and by way of example on the accompanying drawing of which Figure 1 is a side-view of a gearing designed according to this invention, and Figure 2 a section through the same.

The manner of operation is as follows:

Supposing, the driving shaft 1 is running and the working shaft 9 is now to rotate forwardly, then the continually running filling pump is connected with the liquid coupling 2 by means of the change-over slide-valve 29, and that coupling is filled from the interior by the intermediary of the passage 31 and the annular space 24. The working shaft is now driven by the shaft 1 over the liquid coupling 2, together with the driving part 10 and the driven part 11 which is firmly connected with the pinion shaft 7, further by the pinion 4 and the large wheel 6. The driving part 10 of the coupling 2 rotates on the bearing 16 on the pinion shaft 7, and the coupling 3 which is carried on the gearing casing 22 by the bearings 20 and 21 is empty.

If the working shaft is to rotate now in the other direction, or rearwardly, the turn-over slide-valve 29 is so re-adjusted that the filling pump 28 now sucks from the coupling 2 and fills the coupling 3 from the interior through the passage 30 and the annular space 23. The shaft 9 is now driven by the crank-shaft 1 over the driving part 10 of the emptied liquid coupling 2, the cogged rim 14 of which meshes with the cogged rim 15 of the coupling 3, of which both members 12 and 13 now rotate; as the member 13 is connected with the shaft 8, also the pinion 5 is rotated and, therefore, also the large wheel 6 which now turns the shaft 9 in the reverse direction. The reversal of the direction of rotation is effected solely by reversing the position of the turn-over slide-valve 29. The filling pump is driven by the driving part 12 over the cog-wheels 25 and 26 and the shaft 27. While the whole device is in operation, the pump runs continually and fills the working circuits 2, or 3, respectively, ever anew, and liquid escapes continually through the outlet openings 32, or 33 respectively.

The device is suited for driving working shafts of any kind which require reversing of their direction of rotation such as propeller shafts for ships, driving shafts for motor vehicles, sets of rolling mills, hoists, and the like.

I claim:

A device for reversing working shafts, such as propeller shafts of ships, driving shafts of motor vehicles, rolling mills, hoisting machines and the like to be driven by high-speed engines by means of non reversible liquid transmission gears as well as by cog-wheel transmission gears, comprising in combination, two liquid transmission gears, two shafts, one being coupled with one of said gears, cogged rims provided on the driving members of said gears and meshing with each other, one of said shafts being formed by an extension of the driving shafts of the engine or motor, the other by a separate counter-shaft, pinions connected with the driven parts of said gears, and a large cog-wheel meshing with said pinions substantially as set forth.

In testimony whereof I affix my signature.

Dr. GUSTAV BAUER.